(12) United States Patent
Laborde et al.

(10) Patent No.: US 6,436,858 B1
(45) Date of Patent: Aug. 20, 2002

(54) ORGANIC LENS MOLDS IN INORGANIC GLASS AND NOVEL INORGANIC GLASSES

(75) Inventors: Pascale Laborde, Corning; Daniel L. G. Ricoult, Horseheads, both of NY (US)

(73) Assignee: Corning S.A., Avon Cedex (FR)

( * ) Notice: Subject to any disclaimer, the term of this patent is extended or adjusted under 35 U.S.C. 154(b) by 0 days.

(21) Appl. No.: 09/403,737

(22) PCT Filed: May 6, 1998

(86) PCT No.: PCT/EP98/02806
§ 371 (c)(1),
(2), (4) Date: Jan. 4, 2000

(87) PCT Pub. No.: WO98/50315
PCT Pub. Date: Nov. 12, 1998

Related U.S. Application Data

(60) Provisional application No. 60/051,599, filed on Jul. 2, 1997.

(30) Foreign Application Priority Data

May 7, 1997 (FR) .............................. 97 05631

(51) Int. Cl.$^7$ ..................... C03C 3/093; C03C 3/085; C03C 3/087; C03C 3/11; B28B 7/00
(52) U.S. Cl. ..................... 501/67; 501/56; 501/68; 501/69; 501/70; 428/410; 106/38.9
(58) Field of Search ............... 501/56, 67, 68, 501/69, 72, 70; 428/410; 106/38.2, 38.9

(56) References Cited

U.S. PATENT DOCUMENTS

| | | | |
|---|---|---|---|
| 3,649,236 A | | 3/1972 | Rosenbauer |
| 3,790,260 A | * | 2/1974 | Boyd et al. |
| 3,951,671 A | | 4/1976 | Parry et al. |
| 4,042,405 A | * | 8/1977 | Krohn et al. |
| 4,367,012 A | * | 1/1983 | Ikeda et al. |
| 5,106,403 A | | 4/1992 | Buckley |
| 5,268,335 A | | 12/1993 | Kerko et al. .................. 501/64 |
| 5,525,553 A | | 6/1996 | Brocheton et al. ............ 501/64 |
| 6,121,175 A | * | 9/2000 | Drescher et al. |

* cited by examiner

Primary Examiner—David Sample
(74) Attorney, Agent, or Firm—Angela N. Nwaneri; Peter Rogalskyj

(57) ABSTRACT

The principal object of the present invention is organic lens molds, constituted wholly or in part of at least one specific inorganic glass, advantageously strengthened by a chemical tempering or a thermal tempering. Said glass has the following composition, expressed in percentages by weight: $SiO_2$ 56–66, $Al_2O_3$ 2.5–10, $B_2O_3$ 0.5–7, $Li_2O$ 0–3, $Na_2O$ 8–15, $K_2O$ 3–12, with $Li_2O+Na_2O+K_2O$ 12–20, ZnO 2–12, MgO 0–3, $TiO_2$ 0–0.5, $ZrO_2$ 1–9, CaO 0–1, BaO 0–2, SrO 0–2, with MgO+CaO+SrO+BaO 0–5, Cl 0–0.5, $As_2O_3$+$sb_2O_3$ 0–1. The invention also deals with novel inorganic glasses which have the above composition with a single exception relative to the $Al_2O_3$ content: $Al_2O_3$ 2.5–4.

11 Claims, No Drawings

ORGANIC LENS MOLDS IN INORGANIC GLASS AND NOVEL INORGANIC GLASSES

The present application is 371 of PCT/EP98/02806, filed May 6, 1998, which claims the benefit of U.S. Provisional Patent Application Serial No. 60/051,599, filed Jul. 2, 1997, and of French Patent Application No. 97 05631, filed May 7, 1997.

The principal object of the present invention is novel organic lens molds constituted wholly or in part of at least one specific inorganic glass. Said specific inorganic glass, when novel per se, constitutes a further object of the present invention.

The organic lenses are conventionally obtained by radical polymerization of a polymerizable composition cast between two complementary parts of a glass mold. At least one of these two parts has an internal surface which has an optical quality that confers an adequate surface quality to the cast lens.

Heretofore, the glasses used for constituting said organic lens molds have not in general been developed particularly to this end. Insofar as traditionally, the manufacturers of organic lenses are or have been glass lens manufacturers, the materials used for said molds for said organic lenses are in commercially available ophthalmic glasses. Such glasses have generally been treated thermally or chemically in order to strengthen their mechanical properties.

The inventors have summarized prior art inorganic glass compositions in columns 1 to 10 of the Table below. In double column 11 of said Table, the (novel and not novel) compositions of the glasses for the lens molds according to the invention are found, the composition that shall be reverted to in more detail a little further on in the text. The originality of the invention is demonstrated in considering said Table 1 and the comments relating thereto below.

TABLE 1

| REFERENCE N° | 1 | 2 | 3 | 4 | 5 | 11 INVENTION | |
|---|---|---|---|---|---|---|---|
| Composition (% by weight) | US-A-3,790,260 | US-A-4,042,405 | US-A-4,036,623 | US-A-4,015,045 | US-A-4,012,131 | Glass for molds | Glass per se |
| $SiO_2$ | * | * | 60–75 | 50–58 | * | 56–66 | 56–66 |
| $P_2O_5$ | | 5–15 | | | | | |
| $Al_2O_3$ | 1–5 | 0–5 | 0–7 | 7–17 | (0.2–0.5) | 2.5–10 | 2.5–4 |
| $B_2O_3$ | | 0–2 | | | | 0.5–7 | 0.5–7 |
| $Al_2O_3 + B_2O_3$ | | | | | | | |
| $Li_2O$ | 0 | 0–5 | 0–5 | 0 | | 0–3 | 0–3 |
| $Na_2O$ | * | 4–15 | 5–10 | 8–23 | 3–11 | 8–15 | 8–15 |
| $K_2O$ | * | 3–15 | 5–10 | 0–15 | 7–15 | 3–12 | 3–12 |
| Total $M_2O$ | 12–20 | 12–20 | | 13–25 | 12–20 | 12–20 | 12–20 |
| ZnO | | 0–15 | 2–8 | | * | 2–12 | 2–12 |
| MgO | * | 0–4 | 0–2 | 0–6.5 | * | 0–3 | 0–3 |
| ZnO + MgO | | | | | 3–11 | | |
| $TiO_2$ | * | 0–5 | 0–2 | 0–7 | | 0–0.5 | 0–0.5 |
| ZnO + MgO + $TiO_2$ | 10–20 | | | | | | |
| $ZrO_2$ | | 0–5 | 0–2 | 1–4.5 | (1–5) | 1–9 | 1–9 |
| MgO + $TiO_2$ + $ZrO_2$ | | | | | | | |
| CaO | 0 | | 0–5 | 0–10 | (3–6) | 0–1 | 0–1 |
| MgO + $Al_2O_3$ | | 0.2–5 | | | | | |
| $La_2O_3$ | | 0–15 | | | | | |
| ZnO + $La_2O_3$ + CaO + MgO | | 8–15 | | | | | |
| MgO + CaO | | | | | 2.5–10 | | |
| $TiO_2$ = MgO + CaO | | | | | 4–14 | | |
| BaO | | | | | | 0–2 | 0–2 |
| SrO | | | | | | 0–2 | 0–2 |
| CaO + ZnO + MgO + BaO | | | | | | | |
| SrO + BaO | | | | | | | |
| MgO + CaO + SrO + BaO | | | | | | 0–5 | 0–5 |
| MgO + CaO + SrO + BaO + ZnO + $ZrO_2$ | | | | | | | |
| NaCl | | | | | | 0–0.5 | 0–0.5 |
| $Sb_2O_3$ | | | 0–2 | | | | |
| $CeO_2$ | | | 0–4.5 | | | | |
| $As_2O_3$ | | | 0–1.5 | | | $As_2O_3 + Sb_2O_3$ 0–1 | $As_2O_3 + Sb_2O_3$ 0–1 |
| CTE ($10^{-7}$/° C.) | | | | | | 80–95 | |
| Strain Point | | | | | | >495° C. | |
| Softening Point | | | | | | <810° C. | |
| Compression layer depth | >100 µm | >120 µm | | | >60 µm | >70 µm | |

| REFERENCE N° | 6 | 7 | 8 | 9 | 10 | 11 INVENTION | |
|---|---|---|---|---|---|---|---|
| Composition (% by weight) | US-A-4,259,118 | EP-A-0,600,302 | DE-A-4,325,656 | GB-A-2,299,991 | US-A-3,951,671 | Glass for molds | Glass per se |
| $SiO_2$ | 61.6–79.5 | 55–65 | 73–78 | 50–65 | 58–67 | 56–66 | 56–66 |
| $P_2O_5$ | | | | | | | |
| $Al_2O_3$ | 2.5–14 | 4–10 | 1.5–4 | 5–15 | 4.5–8 | 2.5–10 | 2.5–4 |
| $B_2O_3$ | 1–10.5 | 5–20 | 9–12 | | 0–6 | 0.5–7 | 0.5–7 |
| $Al_2O_3 + B_2O_3$ | | 14–26 | | | | | |
| $Li_2O$ | | 0–3 | 0–4 | 0 | | 0–3 | 0–3 |
| $Na_2O$ | 1.5–6 | 6–18 | 1–5 | 2–7 | 8.5–17 | 8–15 | 8–15 |
| $K_2O$ | | 2–10 | 1–5 | 4–9 | 2–11 | 3–12 | 3–12 |
| Total $M_2O$ | | 13–22 | 5–7 | 7–14 | | 12–20 | 12–20 |
| ZnO | 0–12 | 0–1.5 | 1–2 | | 0–10 | 2–12 | 2–12 |

TABLE 1-continued

| | | | | | | | |
|---|---|---|---|---|---|---|---|
| MgO | 0–3.19 | 0–4 | 0–3 | * | | 0–3 | 0–3 |
| ZnO + MgO | | | | | | | |
| TiO$_2$ | | 0–4 | | | 0–5 | 0–0.5 | 0–0.5 |
| ZnO + MgO + TiO$_2$ | | | | | | | |
| ZrO$_2$ | 0–1.5 | 0–7 | 0.5–3 | 1–6 | 0–6.5 | 1–9 | 1–9 |
| MgO + TiO$_2$ + ZrO$_2$ | | 0–10 | | | | | |
| CaO | 0–4.2 | | 1–3 | * | | 0–1 | 0–1 |
| MgO + Al$_2$O$_3$ | | | | | | | |
| La$_2$O$_3$ | | | | | | | |
| ZnO + La$_2$O$_3$ + CaO + MgO | | | | | | | |
| MgO + CaO | | | | | | | |
| TiO$_2$ = MgO + CaO | | | | | | | |
| BaO | 0–9.6 | | * | * | | 0–2 | 0–2 |
| SrO | | | * | * | | 0–2 | 0–2 |
| CaO + ZnO + MgO + BaO | 3.2–17.9 | | | | | | |
| SrO + BaO | | | | | | | |
| MgO + CaO + SrO + BaO | | | | 12–25 | | 0–5 | 0–5 |
| MgO + CaO + SrO + BaO + ZnO + ZrO$_2$ | | | 6–10 | | | | |
| NaCl | 0–0.75 | | | | | 0–0.5 | 0–0.5 |
| Sb$_2$O$_3$ | | | | | 0–1 | | |
| CeO$_2$ | | | | | | | |
| As$_2$O$_3$ | 0–0.5 | 0–0.5 | | | 0–1 | As$_2$O$_3$ + Sb$_2$O$_3$ 0–1 | As$_2$O$_3$ + Sb$_2$O$_3$ 0–1 |
| CTE (10$^{-7}$/° C.) | 33.9–53.7 | 70.8–96.7 | 30–60 | | | 80–95 | |
| Strain Point | Tg 566–660° C. | 450–503° C. | | | | >495° C. | |
| Softening Point | 821–845° C. | 688–706° C. | >830° C. | | | <810° C. | |
| Compression layer depth | | | | >10 μm | | >70 μm | |

The ophthalmic glasses described in U.S. Pat. No. 3,790,260 (Ref. 1) are glasses of high strength, strong UV absorption (insofar as TiO$_2$ is a major constituent of it). They are free from ZrO$_2$ and CaO.

The U.S. Pat. No. 4,042,405 (Ref. 2) describes a phosphosilicate glass having a compression layer depth greater than 120 μm.

The U.S. Pat. No. 4,036,623 (Ref. 3) describes white glasses known as "crown" glasses which are strengthened by a specific treatment which includes:

a pre-heating of said glasses, then, an immersion of these glasses into a molten KNO$_3$ bath at a temperature higher than the strain point of said glasses (advantageously at a temperature between 510 and 710° C.); this without inducing optical distortion.

Said white glasses do not contain any B$_2$O$_3$ and generally comprise CaO.

The U.S. Pat. No. 4,015,045 (Ref. 4) describes glass compositions which are perfectly appropriate for producing flat glasses. Said compositions contain a significant amount of TiO$_2$ and do not contain any ZnO.

The U.S. Pat. No. 4,012,131 (Ref. 5) describes a glass for ophthalmic lenses, strengthened by an ion exchange technique, which has a compression layer depth greater than 60 μm. Said glass does not contain any ZnO.

The U.S. Pat. No. 4,259,118 (Ref. 6) describes thermally pre-stressable glasses which have a low linear coefficient of thermal expansion and high strain point and softening point. Said glasses do not contain any K$_2$O.

The EP application EP-A-0 600 302 (Ref. 7) describes fast strengthenable boroaluminosilicate glass lenses (strengthenable in less than 4 hours). Said glass contains a large amount of B$_2$O$_3$, a small amount of ZnO (advantageously, it does not contain any ZnO) and can be ZrO$_2$-free.

The German application DE-A-4 325 656 (Ref. 8) describes glass fire protection articles in a glass which is very rich in silica. No mention is made in this document of the applications of said glass in the optical and/or ophthalmic molds or lens fields.

Finally, the GB application GB-A-2 299 991 (Ref. 9) describes a chemically strengthened aluminosilicate glass for magnetic disks of low thickness. Said glass does not contain any B$_2$O$_3$, it contains Na$_2$O at a maximal amount of 7% and the minimal amount of intervening MgO+CaO+BaO+SrO is more than 5%.

The use of these prior art inorganic glasses, which are different from those of the invention, has never been described nor suggested as molds for organic lenses.

The U.S. Pat. No. 3,951,671 (Ref. 10) describes glass compositions for use in making ophthalmic lenses or lens blanks which can subsequently be toughened by an ion-exchange process. The use of said glass compositions as molds for organic lenses is neither described nor suggested.

Within the particular context of molds for organic lenses, CORNING, SCHOTT and HOYA have especially used glasses known under the code-names:

QE-8092 (Danville), LJ-8361 (Danville), TRC 33 (Bagneaux) and BL, for CORNING (the first of these 4 glasses, referenced QE-8092, described in the U.S. Pat. No. 3,790,260, was placed on the market in the 1970's. It was created in order to have a better impact resistance than the second of said 4 glasses, referenced LJ-8361, itself placed on the market in the 1940's. To this end, said glass QE-8092 undergoes a chemical strengthening);

CHW-0991 and S-3 for SHOTT;

N-4 for HOYA.

Amongst these 7 glasses, only that referenced CHW-0991 is not a standard ophthalmic glass but is a glass developed specifically for preparing organic lens molds. Its properties are nevertheless very close to those of such a standard ophthalmic glass: QE-8092. The compositions of said two glasses—CHW-0991 and QE-8092—are in fact very close. Said two glasses contain significant amounts of TiO$_2$ (about 0.8%).

The same applies for the two other glasses referenced TRC 33 and S-3. They contain 1.5 and 0.6% TiO$_2$ respectively.

The LJ-8361 glass itself contains 0.4% TiO$_2$ and 8.4% CaO.

The N-4 glass itself has a high $Al_2O_3$ content (14% by weight), $Li_2O$ (4.1% by weight), CaO (2.6% by weight) and does not contain any ZnO.

The BL glass the standard "crown" white glass itself contains about 70% $SiO_2$, 9% CaO and only 0.7% $Al_2O_3$. This glass is thermostrengthenable.

Within the context of inorganic glasses in general and inorganic glasses used for organic lens molds in particular, the inventors preside novel organic lens molds constituted wholly or in part of at least one specific inorganic glass which is free or almost free from $TiO_2$ and which is perfectly suitable as a material for such organic lens molds. Said novel organic lens molds constitute the principal object of the present invention. The specific inorganic glasses likely to enter into their composition constitute a further object of the present invention when they are novel.

The organic lens molds of the invention are characteristically constituted wholly or in part of at least one inorganic glass having the following composition, expressed in percentages by weight:

|      |                          |         |
|------|--------------------------|---------|
|      | $SiO_2$                  | 56–66   |
|      | $Al_2O_3$                | 2.5–10  |
|      | $B_2O_3$                 | 0.5–7   |
|      | $Li_2O$                  | 0–3     |
|      | $Na_2O$                  | 8–15    |
|      | $K_2O$                   | 3–12    |
| with | $Li_2O + Na_2O + K_2O$   | 12–20   |
|      | ZnO                      | 2–12    |
|      | MgO                      | 0–3     |
|      | $TiO_2$                  | 0–0.5   |
|      | $ZrO_2$                  | 1–9     |
|      | CaO                      | 0–1     |
|      | BaO                      | 0–2     |
|      | SrO                      | 0–2     |
| with | MgO + CaO + SrO + BaO    | 0–5     |
|      | Cl                       | 0–0.5   |
|      | $As_2O_3 + Sb_2O_3$      | 0–1.    |

(The + in the expression $As_2O_3+Sb_2O_3$ must be read: and/or).

According to an advantageous variant, said inorganic glasses are $TiO_2$-free. Within the context of this advantageous variant, the particularly preferred glass compositions for the lens molds of the invention are given below:

|                       |          |
|-----------------------|----------|
| $SiO_2$               | 61.5–63  |
| $Al_2O_3$             | 2.5–4    |
| $B_2O_3$              | 0.5–3    |
| $Li_2O$               | 0–0.5    |
| $Na_2O$               | 8–15     |
| $K_2O$                | 5–10     |
| ZnO                   | 7–12     |
| MgO                   | 0–3      |
| $ZrO_2$               | 1–7      |
| CaO                   | 0–1      |
| BaO                   | 0–2      |
| SrO                   | 0–2      |
| Cl                    | 0–0.5    |
| $As_2O_3 + Sb_2O_3$   | 0–1.     |

These glasses (constitutive of the lens molds according to the invention) whose interesting properties are developed further on in the present text (it may already be mentioned that they are transparent white glasses which have a good UV transmission, a low sensitivity to said UVs, an interesting chemical durability and which are (easily) mechanically strengthenable) may advantageously be strengthened mechanically by methods of chemical or thermal tempering. Such methods are methods known per se.

A chemical tempering, advantageously carried out under specific conditions (in any case different from those described in the U.S. Pat. No. 4,036,623), is most particularly recommended for the reinforcement of these glasses.

During the method referred to as thermal tempering, the glass is, in a manner known per se, heated above its annealing point (typically, for the glasses in question, at temperatures corresponding to $10^{10.2}$–$10^{9.2}$ poises) and is then abruptly cooled by jets of air. The low thermal conductivity of the glass makes it that the core layers congeal and retract after the shallow layers, thus placing the latter layers under compression.

The profile of constraints obtained is parabolic with a core extension equal to half the surface compressions. The level of constraints is proportional to the strengthenability and the thickness of the glass.

The strengthenability of the glass is itself proportional to the CTE (dilation coefficient) of the glass and to its Young's modulus and is inversely proportional to the thermal conductivity of the glass.

The glasses constitutive of the lens molds according to the invention are particularly suited to the thermal tempering (by virtue of their high CTEs and Young's moduli, as well as by virtue of their softening point lower than 810° C.: see later on): they can thus be treated within the traditional temperature ranges.

The chemical tempering allows mechanically strengthening a glass, for example, a glass lens, by compressing the surface of said glass. This result is obtained by an ion exchange mechanism; the glass being immersed in a molten salt bath at a given temperature. Under the effect of the temperature, an exchange takes place between the alkali ions ($Na^+$, $Li^+$), which leave the surface of the glass, and those which are larger (generally $K^+$) which are present in the molten salt, which then penetrate the glass. After cooling, the surface of the treated glass is placed under compression compared to the core of said glass, this thus induces a strengthening of said glass by an increase of its resistance to breakage. The compressed layer thus formed is uniform.

According to the prior art, in the case of the "crown" white glasses and fixed tint lenses, the chemical tempering is carried out for sixteen hours in a bath composed of 99.5% potassium nitrate ($KNO_3$) and 0.5% silicic acid ($H_2SiO_3$), at a temperature of 450° C.

The glasses constitutive of the lens molds according to the invention are therefore advantageously strengthened by such a chemical tempering method known per se. Within the context of the present invention, the inventors have most particularly adapted such a chemical tempering method to the specific glasses constitutive of the lens molds according to the invention. The inventors recommend therefore, according to a particularly advantageous variant, to carry out the chemical tempering with these specific glasses under the conditions below:

in a potassium or (and) sodium nitrate bath; and in a particularly preferred manner, in a potassium nitrate bath;

at a temperature between 425 and 475° C.; and in a particularly preferred manner, at a temperature between 440 and 450° C.;

for 10 to 20 hours; and in a particularly preferred manner for 12 to 20 hours (typically for 16 hours).

The thus thermally or chemically (advantageously chemically) treated glasses can have a shallow compression layer of depth greater than or equal to 70 μm. Such glasses, with such a compression layer are particularly preferred. They have a mechanical resistance which is comparable, even better than that of prior art glasses known under the code name TRC 33 (mechanical resistance evaluated by MOR on unabrased samples).

It is now suggested to revert back in greater detail to the weight composition of the glasses constitutive of the lens molds according to the invention; the original composition which especially allows said glasses to respond as favorably to the thermal and chemical tempering methods.

Silica, $SiO_2$, is the oxide which forms the network of the glass and it intervenes between 56 and 66% by weight in the composition of these glasses. If it intervenes in too low an amount (<56%), the glass becomes susceptible to deterioration; if it intervenes in too great an amount (>66%), the glass becomes difficult to melt. The silica content of these glasses is advantageously between 61.5 and 63% by weight.

It is specified here in a general manner that the preferred ranges, indicated for the content of each one of the constituents are on the one hand preferred, in themselves, i.e. independent of the preferred ranges indicated for the other constituents and on the other hand, particularly preferred, taken in combination with said preferred ranges for the other constituents.

$Al_2O_3$ enables:
improving the chemical resistance of these glasses;
increasing the ionic exchange kinetics which takes place between an alkali of the shallow layer of said glasses and an alkali of a higher ionic level, and thus enables increasing the depth of the compression layer generated during the thermal or chemical tempering. $Al_2O_3$ intervenes between 2.5% and 10% by weight, above which value the glass becomes very viscous and difficult to melt. Preferably, the glasses constitutive of the lens molds according to the present invention have an $Al_2O_3$ content between 2.5 and 4%.

$B_2O_3$ enables improving the melting of these glasses. Said glasses contain between 0.5 and 7% thereof by weight. An excessive $B_2O_3$ content is detrimental to the durability of the glass as well as for the maintenance of the strain point above 495° C. Preferably, the $B_2O_3$ content is between 0.5 and 3% by weight.

The alkali oxides act as flux during the melting of the glass, and they are therefore indispensable components for preparing said glass. $Na_2O$ is an essential component for the ionic exchange which takes place during the chemical tempering advantageously carried out. Its content is between 8 and 15% by weight in the glasses. If its content is too high, the chemical deteriorability appears and the strain point decreases.

The presence of $K_2O$ in the composition of the glasses enables improving the ionic exchange rate and controlling the thickness of the compression layer by altering the proportion between the two oxides $Na_2O$ and $K_2O$. Moreover, its introduction in the composition of the glasses instead of $Na_2O$ enables decreasing the corrosion of the surface after chemical tempering. $K_2O$ is present between 3 and 12% by weight and preferably between 5 and 10%.

$Li_2O$ may also be present in the composition, and this so as to increase the level of compression in the layer by exchange between the lithium and the potassium of the chemical tempering bath. The $Li_2O$ content is between 0 and 3% by weight and preferably between 0 and 0.5% by weight.

The total alkali content ($Li_2O+Na_2O+K_2O$) in the composition of said glasses is maintained between 12 and 20% by weight especially so as to control the level of compression, the depth of the compression layer and the durability before and after chemical tempering.

ZnO enables improving the melting of the glasses as well as their viscosity, this without interfering with the eventual chemical tempering carried out. ZnO is present at the rate of 2 to 12% by weight, advantageously at the rate of 7 to 12% by weight.

$TiO_2$ may intervene in the composition of the glasses especially so as to improve their chemical durability. However, its presence at a content greater than 0.5% by weight induces an absorption in the UV between 310 nm and 400 nm, which is detrimental to the recommended use of said glasses (detrimental to the UV exposure treatment of the organic lenses which takes place across the glass molds of the invention). $TiO_2$ is therefore always present in a content lower than or equal to 0.5%. Advantageously, it is excluded from the composition of the glasses constitutive of the lens molds according to the invention.

$ZrO_2$ is an oxide which enables improving the chemical durability of the glasses and especially their alkali durability and their hydrolytic resistance. A minimum of 1% by weight is necessary for taking advantage of this effect in the glasses. If the ZrO) content is too great, the melting of the glass becomes very difficult. The $ZrO_2$ content is therefore lower than or equal to 9%, and is preferably between 1 and 7% by weight.

The alkaline-earth elements, CaO, MgO, SrO, BaO have act as flux in an analogous way to the alkalis; this is the reason why they may advantageously be present in the glasses, so as to improve the melting and the forming of said glasses. But, insofar as CaO has a tendency to deteriorate the chemical strengthenability, its content remains between 0 and 1% by weight. The MgO content is between 0 and 3% by weight and those of BaO and SrO between 0 and 2% by weight.

The total CaO+MgO+BaO+SrO is between 0 and 5% by weight.

Cl is optionally present to improve the melting of the glass and to contribute to its finishing in contents between 0 and 0.5% by weight as well as other finishing agents, $As_2O_3$ and/or $Sb_2O_3$ which are themselves optionally present at a total content between 0 and 1% by weight. The intervention of other finishing agents (such as Br, F and/or $SO_3$, for example) is in no way excluded from the context of the present invention.

To all useful ends, it is hereby specified that, for what relates to the optional components ($Li_2O$, MgO, $TiO_2$, CaO, BaO, SrO, Cl, $As_2O_3$, $Sb_2O_3$), the minimal intervening amount from which they exert a significant effect is generally in the order of 0.5%. Thus, the glasses constitutive of the lens molds according to the invention cannot contain said constituents or, if they contain them, it is generally in a minimal amount of 0.5% (% by weight).

The said glasses essentially consist of the constituents indicated above. It would not however be totally excluded that they contain other constituents within them. Such constituents can in any case intervene in low amounts and have not a significant influence on the properties sought after.

The said glasses, such as described above, are, as already indicated, transparent white glasses. Their properties are specified below. They are characterized:

by a good transmission in the UVs. Thus, their transmission at 315 nm is better than that of the BL glass, the reference in this field;

by a lower sensitivity to solarization under UV. The inventors have tested the said glasses in keeping them exposed for 200 hours under a Xenon lamp or a Mercury/Xenon lamp. In both cases, the inventors have been able to verify, by measuring the transmission, before and after exposure, that said glasses were not darkened. This is particularly important from the point of view of the application of said glasses sought after. In fact, the UV crosslinking of polymerizable compositions cast in glass molds (through the walls of said molds) is the technology which is carried out more and more for the production of organic lenses (by polymerization);

by the physical properties below:
strain point; >495° C.,
softening point: <810° C.;
CTE: 80–95×10$^{-7}$/° C.;
density: <2.8;
Young's Modulus: >70,000 Mpa;
Liquidus viscosity: >10$^3$ Pa·s (10,000 poises).
(Such Liquidus viscosity values are particularly interesting insofar as they make it possible to make the glasses by the standard industrial technologies);

by a very good chemical durability, which is greater than that of the lo prior art glasses known under the code names QE-8092 and TRC 33 (Corning glasses used for organic lens molds, vide supra) and comparable to that of the standard white "crown" BL glass (also vide supra) which itself also can be thermally strengthened. Said chemical durability has been measured. The results below have been obtained for the said glasses:
acid durability (evaluated according to the standard DIN 12116 (vide infra)): on glasses tempered chemically in a $KNO_3$ bath at 440° C. for 16 hours, the weight loss is less than 3 mg/dm$^2$; it is 1 mg/dm$^2$ for certain preferred glasses;
alkali durability (evaluated according to the standard NF B35602 (vide infra)): on glasses tempered chemically (under the same conditions), the weight loss is less than 200 mg/dm$^2$;
hydrolytic resistance (evaluated according to the standard NF B25601 (vide infra)): the weight loss is less than 150 mg/dm$^2$;

by their thermal or chemical strengthenability: this has already been developed earlier on in the present text.

The manufacture of these glasses constitutive of the lens molds according to the invention does not present any particular difficulty; it does not require any unusual conditions or measures. The manufacture is within the reach of the person skilled in the art.

The classical starting materials, such as oxides, carbonates and nitrates, can be used for preparing fillers to be melted. The usual precautions, as for the purity of said intervening starting materials, in order to obtain optical glasses suffice (obviously if it is desired to obtain glasses of optical quality).

To all useful ends, with reference to the manufacture of these glasses, the following can be given in an illustrative manner. The values indicated for the parameters of the method correspond to the operating method carried out for preparing the glasses in the Examples below. These values are in no way limiting. The constituents of the glasses can be brought about by the starting materials specified below:

| Oxides | Starting materials |
|---|---|
| $SiO_2$ | Quartz, Sand |
| $Al_2O_3$ | Hydrated alumina |
| $B_2O_3$ | $B(OH)_3$ |
| $ZrO_2$ | $ZrO_2$ |

-continued

| Oxides | Starting materials |
|---|---|
| $TiO_2$ | $TiO_2$ |
| CaO | $CaCO_3$, $Ca(NO_3)_2$ |
| SrO | $SrCO_3$ |
| BaO | $BaCO_3$, $Ba(NO_3)_2$ |
| MgO | $MgCO_3$ |
| ZnO | ZnO |
| $Li_2O$ | $Li_2CO_3$ |
| $Na_2O$ | $Na_2CO_3$, $NaNO_3$ |
| $K_2O$ | $K_2CO_3$, $KNO_3$ |

The starting materials selected preferably contain a content of transition metal, particularly $Fe_2O_3$ and $TiO_2$, less than 160 ppm in order that the glass obtained has a very interesting transmission in the UV and the visible.

After weighing, the various starting materials are mixed according to common techniques. The mixture is then placed in the oven in a platinum crucible at a temperature of about 1,400° C.; when it is perfectly molten, the temperature of the bath is brought to about 1,500–1,550° C. for the homogenization of the finishing. The bath of the glass is then cooled to a temperature corresponding to the viscosity which is adequate for forming the glass. This glass is then cast in the form of a bar.

The total duration of the operation is in the order of 2 to 7 hours. After forming, the glass is baked again at about 650° C. with a cooling rate of 60° C./hour.

According to another of its objects, the present invention relates to the use of the glasses having the compositions specified above and which have advantageously been strengthened (by a chemical or thermal tempering) for the production of organic lens molds. Said organic lens molds according to the invention are perfectly appropriate, as indicated further on in the present text, for preparing said lenses by polymerization of a polymerizable composition cast within them; the polymerization (cross-linking) carried out under UV irradiation through the walls (in specific glass of the invention) of said molds.

Among the glasses having the compositions specified above-glasses particularly suitable as constitutive elements of organic lens molds—some are novel and, as already indicated, constitute a further object of the invention. The said further object consists of the inorganic glasses having the following composition A, and advantageously the following composition B, expressed in percentages by weight:

|  |  | A | B |
|---|---|---|---|
|  | $SiO_2$ | 56–66 | 61.5–63 |
|  | $Al_2O_3$ | 2.5–4 | 2.5–4 |
|  | $B_2O_3$ | 0.5–7 | 0.5–3 |
|  | $Li_2O$ | 0–3 | 0–0.5 |
|  | $Na_2O$ | 8–15 | 8–15 |
|  | $K_2O$ | 3–12 | 5–10 |
| with | $Li_2O + Na_2O + K_2O$ | 12–20 |  |
|  | ZnO | 2–12 | 7–12 |
|  | MgO | 0–3 | 0–3 |
|  | $TiO_2$ | 0–0.5 |  |
|  | $ZrO_2$ | 1–9 | 1–7 |
|  | CaO | 0–1 | 0–1 |
|  | BaO | 0–2 | 0–2 |
|  | SrO | 0–2 | 0–2 |

-continued

|  | | A | B |
|---|---|---|---|
| with | MgO + CaO + SrO + BaO | 0–5 | |
| | Cl | 0–0.5 | 0–0.5 |
| | $As_2O_3 + Sb_2O_3$ | 0–1 | 0–1. |

All the precisions generally given above in reference to the (novel or not novel) glasses constitutive of the lens molds according to the invention obviously apply to the novel ones, which are claimed per se. It must consequently be understood that the following novel glasses are preferred those of composition A which are $TiO_2$-free;

those of composition A or B which have been strengthened by a chemical tempering or heat tempering, advantageously a chemical tempering;

those of composition A or B which have been strengthened by a chemical tempering carried out in a potassium or (and) sodium nitrate bath, advantageously potassium nitrate bath, at a temperature between 425° C. and 475° C., for 10 to 20 hours;

those of composition A or B which have a shallow compression layer of depth at least equal to 70 μm.

The invention is illustrated in an entirely non-limiting manner by Examples 4 to 14 below. Examples 4 and 14 are particularly preferred. The glasses corresponding thereto belong to the preferred field. Examples 1 to 3 are given by way of comparison. They relate to:

the prior art standard white "crown" BL glass (Example 1);

the prior art TRC 33 glass (Example 2);

a glass without zirconium (Example 3), respectively.

The glasses whose compositions are given in Table 2 below have been prepared according to the operating method specified above (this operating method was carried out on a laboratory scale. It is entirely obvious that the glasses can be manufactured industrially by using conventional methods of melting and forming). Said compositions are expressed in percentages by weight.

the surface, expressed in PSI. A mechanical control by measuring the rupture modulus (MOR) (flexion in 3 points) on the polished sample of 32 mm diameter, depth 3 mm has also been effected (measurement expressed in MPa).

The measurements of the refractive index and the Abbe number are carried out according to the usual methods (for nd, the yellow ray of He is used) on re-baked samples.

The density is measured with the aid of a Micromeritics helium picnometer.

The elasticity modulus (Young's modulus) and the Poisson coefficient of these glasses have also been measured.

The U.V./Visible transmission from 300 to 800 nm is determined on a polished sample of 2 mm depth with the aid of a Perkin-Elmer Lambda 9 spectrophotometer.

The acid durability is evaluated by the test of the standard DIN 12116. It consists in determining the weight loss of a polished sample, immersed for 3 hours in a 20% hydrochloric acid solution at 100° C. The weight loss is expressed in $mg/dm^2$.

The results are expressed in classes:

Class 1: loss of less than 0.7 $mg/dm^2$

Class 2: loss of 0.7 to 1.5 $mg/dm^2$

Class 3: loss of more than 1.5 $mg/dm^2$.

The alkali durability is evaluated by the test of the standard NF B35602. It consists in determining the weight loss of a polished sample immersed for 3 hours in a mixture in equal proportions of normal solutions of NaOH and $Na_2CO_3$.

Class 1: loss of less than 75 $mg/dm^2$

Class 2: loss of 75 to 150 $mg/dm^2$

Class 3: loss of more than 150 $mg/dm^2$.

The hydrolytic resistance is evaluated by the test of the standard NF B35601. The glass is ground (grains of 300 to 420 microns) and maintained in distilled water at 100° C. for one hour. The alkalis are then determined and expressed in μg/g of glass.

Class 1: loss of less than 30 μg/g of glass

Class 2: loss of 30 to 60 μg/g of glass

Class 3: loss of 60 to 260 μg/g of glass

TABLE 2

| Example Composition (% by weight) | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $SiO_2$ | 69.9 | 64.9 | 62.97 | 62.72 | 61.82 | 61.74 | 63.84 | 62.84 | 65.18 | 60.05 | 58.31 | 56.61 | 61.5 | 62.1 |
| $Al_2O_3$ | 0.07 | 2.7 | 2.8 | 2.79 | 2.77 | 3.75 | 9.3 | 9.24 | 2.7 | 2.74 | 2.71 | 2.68 | 2.64 | 3.71 |
| $B_2O_3$ | 0.55 | 3 | 0.955 | 0.95 | 0.95 | 0.96 | 6.63 | 6.59 | 3 | 0.94 | 0.92 | 0.91 | 2.94 | 0.95 |
| $Li_2O$ | 0 | 0 | 0 | 0 | 0 | 0 | 0 | 0 | 0 | 0 | 0 | 0 | 0 | 0 |
| $Na_2O$ | 11.25 | 10.18 | 8.44 | 8.41 | 8.36 | 11.36 | 15.18 | 15.09 | 10.26 | 8.27 | 8.18 | 8.09 | 10.02 | 10.41 |
| $K_2O$ | 5 | 8.45 | 9.39 | 9.35 | 9.3 | 5.12 | 3.8 | 3.77 | 8.54 | 9.2 | 9.09 | 9 | 8.34 | 7.35 |
| ZnO | 0 | 7 | 11.76 | 11.71 | 11.64 | 11.84 | 0 | 0 | 7.03 | 11.51 | 11.38 | 11.26 | 6.87 | 9.71 |
| MgO | 1 | 0 | 2.95 | 2.94 | 2.92 | 2.97 | 0 | 0 | 0 | 2.89 | 2.86 | 2.82 | 0 | 2.94 |
| $TiO_2$ | 0 | 1.5 | 0.73 | 0 | 0 | 0 | 0 | 0 | 0 | 0 | 0 | 0 | 0 | 0 |
| $ZrO_2$ | 0 | 0 | 0 | 1.12 | 2.23 | 2.27 | 1.24 | 2.47 | 2.29 | 4.41 | 6.55 | 8.63 | 6.71 | 3.24 |
| CaO | 9 | 1 | 0 | 0 | 0 | 0 | 0 | 0 | 0.99 | 0 | 0 | 0 | 0.97 | 0 |
| $Sb_2O_3$ | 0.6 | 0.6 | 0.6 | 0.6 | 0.6 | 0.6 | 0.6 | 0.6 | 0.6 | 0.6 | 0.6 | 0.6 | 0.6 | 0.6 |

The physical and chemical properties of these glasses were determined according to the following protocols.

After chemical tempering, the level of compression attained is controlled by an optical method on a thin blade by measuring the depth of the layer put under compression, expressed in microns, as well as the level of compression on Class 4: loss of 260 to 600 μg/g of glass Class 5: loss of more than 600 μg/g of glass.

The deteriorabilities of the glasses, notably acid and alkali durabilities, were characterized on the glasses before and after chemical tempering.

Said physical and chemical properties of said glasses of the invention according to Examples 4 to 14 (as a matter of fact it must be understood that only novel glasses according to Examples 4–6, 9–14 are actually glasses of the invention; while glasses according to Examples 7 and 8 are prior art glasses suitable as constitutive glasses for lens molds according to the invention) as well as those of the glasses according to Examples 1 to 3 are given in the Table 3 below.

In considering the values indicated in said Table, the person skilled in the art immediately appreciates the interest of the invention.

TABLE 3

| Example Properties | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CTE*$10^{-7}$/° C. | 96 | 95 | 94.7 | 94.2 | 93.1 | 88.8 | 86.8 | | 86.7 | 90.1 | 87.9 | 85.6 | 89.9 | 85.2 |
| Strain Point (° C.) | 497 | 486 | 502 | 510 | 521 | 512 | 505 | 502 | 493 | 533 | 550 | 563 | 531 | 529 |
| Annealing Point (° C.) | 539 | 528 | 550 | 557 | 568 | 560 | 547 | 544 | 536 | 578 | 595 | 607 | 572 | 576 |
| Softening Point (° C.) | 714 | 703 | 747 | 757 | 769 | 758 | 712 | 707 | 719 | 782 | 798 | 807 | 771 | 776 |
| Durability before chem. tempering | | | | | | | | | | | | | | |
| Acid DIN 12116 class | 2 | 1 | 1 | 1 | 1 | 1 | 2 | 3 | 2 | 3 | 3 | 2 | 2 | |
| weight loss (mg/dm$^2$) | 0.8 | 0.1 | 0.3 | 0.3 | 0.6 | 0.4 | 1.2 | 3 | 1.2 | 1.7 | 1.8 | 1.2 | 1 | |
| Alkali NF B35602 class | 2 | 2 | 2 | 1 | 1 | 1 | 2 | 1 | 1 | 1 | 1 | 1 | 1 | |
| weight loss (mg/dm$^2$) | 83 | 165 | 93.1 | 49.1 | 41.5 | 31.8 | 96.2 | 70.6 | 64 | 42.3 | 35.3 | 25.4 | 29.4 | |
| Hydrolytic NF B35601 class | 3 | 3 | 3 | 3 | 3 | 3 | 3 | 3 | 3 | 3 | 3 | 3 | 3 | 3 |
| weight loss ($\mu$g/g) | 210 | 168 | 119.9 | 103.3 | 88.9 | 89.9 | 80.6 | 74.4 | 127 | 86 | 88 | 68 | 100 | 68.2 |
| Mechanical properties | | | | | | | | | | | | | | |
| E(Gpa) | 73.6 | 71.5 | 70.5 | 71 | 71.3 | 72.5 | 75.9 | 76.4 | 71.6 | 74 | 74 | 78 | 75.1 | |
| G(Gpa) | 30 | 29 | 28.5 | 29 | 29 | 29.1 | 31.4 | 31.4 | 29.2 | 29.9 | 29.9 | 31.6 | 30.6 | |
| v | 0.22 | 0.22 | 0.24 | 0.22 | 0.23 | 0.23 | 0.21 | 0.22 | 0.23 | 0.239 | 0.236 | 0.235 | 0.228 | |
| d | 2.54 | 2.56 | 2.61 | 2.62 | 2.63 | 2.64 | 2.48 | 2.5 | 2.575 | 2.67 | 2.71 | 2.75 | 2.65 | |
| Chemical tempering | | | | | | | | | | | | | | |
| 440° C. 16 h | | | | | | | | | | 450° C. 16 h | 450° C. 16 h | 450° C. 16 h | 450° C. 16 h | 440° C. 16 h |
| MOR (MPa) | | 606 | 712 | 796 | 760 | 899 | 674 | 627 | 646 | 820 | 896 | 988 | 861 | 934 |
| delta | | 23 | 86 | 100 | 103 | 93 | 65 | 77 | 101 | 33 | 117 | 113 | 121 | 117 |
| Durability after chem. tempering 440° C. 16 h | | | | | | | | | | | | | | |
| Acid class | | 1/2 | 3 | 2 | | | | | | | | | | 2 |
| weight loss (mg/dm$^2$) | | 0.8–0.5 | 1.6 | 1 | | | | | | | | | | 1.4 |
| Alkali class | | 2 | 2 | 2 | | | | | | | | | | 1 |
| weight loss (mg/md$^2$) | | 165 | 110.2 | 83.4 | | | | | | | | | | 56.6 |
| Transmission (2 mm) | | | | | | | | | | | | | | |
| Tvis | 91.8 | 91.5 | 91.4 | 91.7 | 91.7 | 92.1 | 92.1 | 92 | 92.05 | 91.3 | 91.4 | 91.3 | 91.5 | 92 |
| x | 0.3104 | 0.3105 | 0.3106 | 0.3104 | 0.3104 | 0.3104 | 0.3105 | 0.3104 | 0.3104 | 0.3105 | 0.3105 | 0.3106 | 0.3104 | 0.3105 |
| y | 0.3167 | 0.317 | 0.3169 | 0.3166 | 0.3166 | 0.3167 | 0.3166 | 0.3166 | 0.3166 | 0.3167 | 0.3167 | 0.3168 | 0.3166 | 0.3167 |
| T315 nm | 62.7 | 0 | 50.1 | 84.7 | 84.7 | 83.9 | 86.5 | 86.7 | 87.02 | 82.1 | 82.4 | 80.8 | 85.6 | 83.9 |
| T340 nm | 86.8 | 30 | 84.6 | 90 | 90 | 90.3 | 90.75 | 90.6 | 90.6 | 89.08 | 89.33 | 88.7 | 90.07 | 90 |

What is claimed is:

1. Organic lens mold comprising at least one inorganic glass comprising the following composition, expressed in percentages by weight:

|      |                          |          |
|------|--------------------------|----------|
|      | $SiO_2$                  | 56–66    |
|      | $Al_2O_3$                | 2.5–10   |
|      | $B_2O_3$                 | 0.5–7    |
|      | $Li_2O$                  | 0–3      |
|      | $Na_2O$                  | 8–15     |
|      | $K_2O$                   | 3–12     |
| with | $Li_2O + Na_2O + K_2O$   | 12–20    |
|      | ZnO                      | 2–12     |
|      | MgO                      | 0–3      |
|      | $TiO_2$                  | 0–0.5    |
|      | $ZrO_2$                  | 1–9      |
|      | CaO                      | 0–1      |
|      | BaO                      | 0–2      |
|      | SrO                      | 0–2      |
| with | MgO + CaO + SrO + BaO    | 0–5      |
|      | Cl                       | 0–0.5    |
|      | $As_2O_3 + Sb_2O_3$      | 0–1.     |

2. Mold according to claim 1, wherein said inorganic glass is $TiO_2$-free.

3. Mold according to claim 2, wherein said inorganic glass has the following composition, expressed in percentages by weight:

|                          |          |
|--------------------------|----------|
| $SiO_2$                  | 61.5–63  |
| $Al_2O_3$                | 2.5–4    |
| $B_2O_3$                 | 0.5–3    |
| $Li_2O$                  | 0–0.5    |
| $Na_2O$                  | 8–15     |
| $K_2O$                   | 5–10     |
| ZnO                      | 7–12     |
| MgO                      | 0–3      |
| $ZrO_2$                  | 1–7      |
| CaO                      | 0–1      |
| BaO                      | 0–2      |
| SrO                      | 0–2      |
| Cl                       | 0–0.5    |
| $As_2O_3 + Sb_2O_3$      | 0–1.     |

4. Mold according to claim 3, wherein said inorganic glass has a compression layer of depth at least equal to 70 μm.

5. Mold according to claim 1, wherein said inorganic glass has been strengthened by a chemical tempering or heat tempering.

6. Mold according to claim 5, wherein said inorganic glass has been strengthened by a chemical tempering carried out in a potassium and/or sodium nitrate bath.

7. Mold according to claim 6, wherein said inorganic glass has been strengthened by a chemical tempering carried out in a potassium nitrate bath at a temperature between 425° C. and 475° C. for 10 to 20 hours.

8. Mold according to claim 7, wherein said inorganic glass has a compression layer of depth at least equal to 70 μm.

9. Mold according to claim 1, wherein said inorganic glass has a compression layer of depth at least equal to 70 μm.

10. Mold according to claim 1, wherein said inorganic glass has the following composition, expressed in percentages by weight:

|      |                          |          |
|------|--------------------------|----------|
|      | $SiO_2$                  | 56–66    |
|      | $Al_2O_3$                | 2.5–4    |
|      | $B_2O_3$                 | 0.5–7    |
|      | $Li_2O$                  | 0–3      |
|      | $Na_2O$                  | 8–15     |
|      | $K_2O$                   | 3–12     |
| with | $Li_2O + Na_2O + K_2O$   | 12–20    |
|      | ZnO                      | 2–12     |
|      | MgO                      | 0–3      |
|      | $TiO_2$                  | 0–0.5    |
|      | $ZrO_2$                  | 1–9      |
|      | CaO                      | 0–1      |
|      | BaO                      | 0–2      |
|      | SrO                      | 0–2      |
| with | MgO + CaO + SrO + BaO    | 0–5      |
|      | Cl                       | 0–0.5    |
|      | $As_2O_3 + Sb_2O_3$      | 0–1.     |

11. Method for producing organic lens molds, said method comprising:

providing an inorganic glass as defined in claim 1, and forming said inorganic glass into a mold.

* * * * *